United States Patent [19]

Holland et al.

[11] Patent Number: 5,354,187

[45] Date of Patent: Oct. 11, 1994

[54] PISTON FOR USE IN A FLUID PUMP LOW PRESSURE ACCUMULATOR ASSEMBLY

[75] Inventors: Russ W. Holland, Holly; Ken Garrigues, Orion Twp., Oakland County, both of Mich.

[73] Assignee: ITT Corporation, New York, N.Y.

[21] Appl. No.: 107,531

[22] Filed: Aug. 16, 1993

[51] Int. Cl.⁵ .............................................. F16L 55/04
[52] U.S. Cl. ...................................... 417/540; 138/31
[58] Field of Search .................... 138/31; 417/540, 541

[56] References Cited

U.S. PATENT DOCUMENTS

| | | | |
|---|---|---|---|
| 718,145 | 2/1905 | Sinclair | 138/31 X |
| 1,418,616 | 6/1922 | Boisset | 417/540 X |
| 2,419,977 | 5/1947 | Wellbrock | 138/31 X |
| 2,457,834 | 1/1949 | Ricketson | 138/31 X |
| 3,142,318 | 7/1964 | Mercier | 138/31 |
| 4,000,758 | 1/1977 | Meisenheimer | 138/31 |
| 4,903,734 | 2/1990 | Merklein et al. | 138/31 X |
| 4,953,591 | 9/1990 | Takagi et al. | 138/31 X |
| 5,104,294 | 4/1992 | Banba | 417/540 X |

FOREIGN PATENT DOCUMENTS

| | | | |
|---|---|---|---|
| 975611 | 10/1975 | Canada | 417/540 |
| 4025910 | 6/1991 | Fed. Rep. of Germany | 417/540 |

*Primary Examiner*—Richard E. Gluck
*Attorney, Agent, or Firm*—Robert P. Seitter; J. Gordon Lewis

[57] ABSTRACT

A low pressure accumulator assembly for use with a fluid pump comprises a pump housing with a longitudinally extending chamber having a base with a fluid flow opening. An accumulator is secured in the pump housing chamber. The accumulator includes an accumulator housing with a longitudinally extending bore. A piston is biased outwardly of the bore to selectively engage the base of the pump housing chamber. A protrusion extends outwardly from the piston to limit an area of engagement between the piston and the base so that fluid flowing from said opening into the chamber may engage a greater area of the piston.

8 Claims, 2 Drawing Sheets

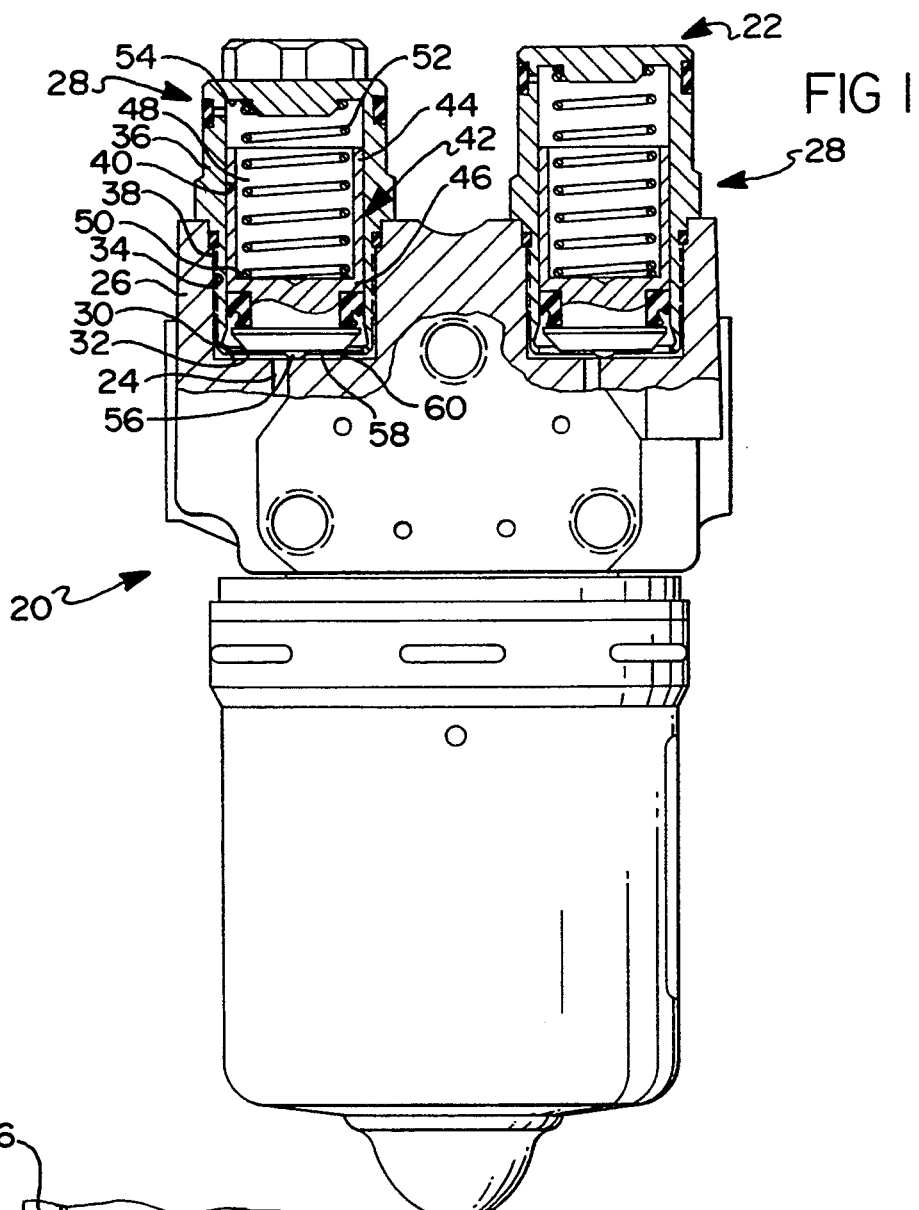
FIG 1
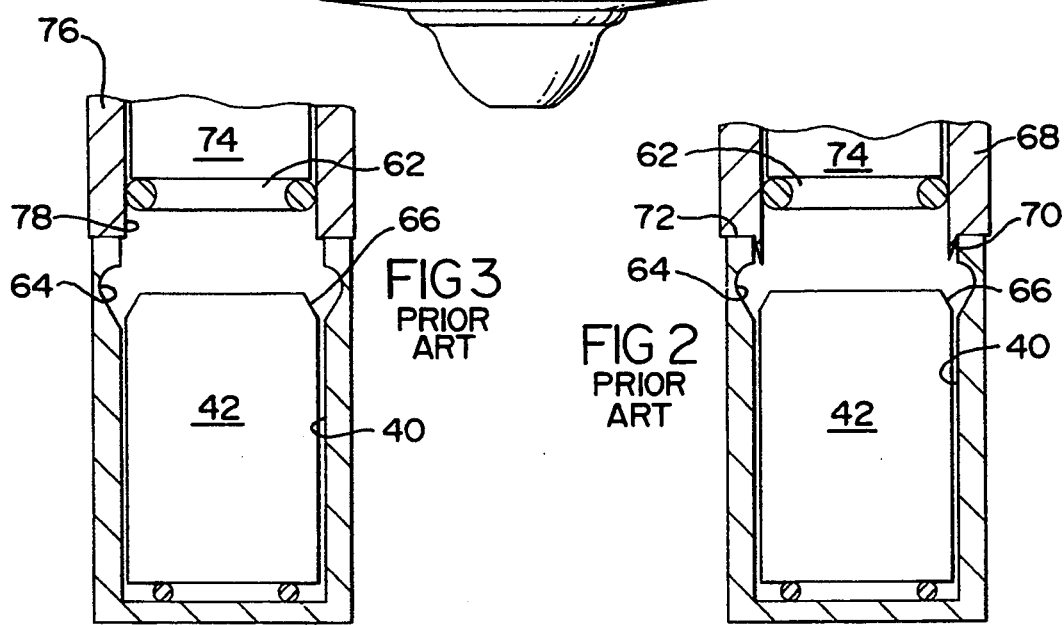
FIG 3 PRIOR ART
FIG 2 PRIOR ART

PISTON FOR USE IN A FLUID PUMP LOW PRESSURE ACCUMULATOR ASSEMBLY

BACKGROUND OF THE INVENTION

The present invention relates generally to a fluid pump having an accumulator assembly comprising an accumulator residing in a cavity of a pump housing with a transverse base, and more particularly to an accumulator piston having a protrusion to limit the area of engagement between the piston and a base of the pump housing cavity.

A low pressure fluid accumulator assembly comprising an accumulator temporarily receives and stores fluid flowing through a fluid flow opening in a base of a pump housing cavity. Accumulators generally include an accumulator housing with a longitudinally extending bore to receive a piston. A biasing means is disposed between a floor of the accumulator housing and the piston to bias the piston longitudinally outwardly from the accumulator housing. The piston selectively engages the base of the pump housing cavity.

A gap is required between the piston and the base of the pump housing cavity in order for pressurized fluid to properly flow into the accumulator assembly. If the area of contact between the piston and the fluid flow is reduced to that portion of the piston immediately adjacent the fluid flow opening, insufficient force will be applied to the outwardly biased piston.

A snap ring has typically been inserted into an upper groove of the accumulator housing to limit the longitudinal travel of the piston, providing the necessary gap between the piston and the base of the pump housing cavity. The high spring rate of the snap ring destroys the tooling used to guide the snap ring or directly damages the accumulator housing. Resulting contamination interferes with proper operation of the accumulator assembly. When used in a system critical application such as an antilock brake, in which proper operation of the accumulator assembly is essential during an antilock braking cycle, such contamination is unacceptable.

SUMMARY OF THE INVENTION

An improved low pressure accumulator assembly for a fluid pump eliminates a need for a snap ring to limit longitudinal travel of an accumulator piston with a piston head biased outwardly from the longitudinal bore of an accumulator housing. Instead, a protrusion extends outwardly from an outer surface of the piston head to selectively engage a transverse base of a pump housing cavity that receives the accumulator. The protrusion provides a gap between the outer surface of the piston head and the base. Thus, pressurized fluid flowing from a fluid flow opening in the base of the pump housing cavity contacts virtually the entire outer surface of the piston head. Sufficient force may be applied by the fluid to overcome the biased piston, resulting in proper operation of the accumulator assembly.

Preferably, a single protrusion is centered on the piston head to prevent induced radial loading between the piston and accumulator housing. In addition, the fluid flow opening is preferably offset from the protrusion to prevent interference between the protrusion and the fluid flow opening.

In a preferred embodiment, the protrusion comprises a nipple integrally formed with the piston head. Alternatively, the protrusion comprises a thrust button disposed in a longitudinal bore of the piston head.

BRIEF DESCRIPTION OF THE DRAWINGS

The features and inventive aspects of the present invention will become more apparent upon reading the following detailed description, claims, and drawings, of which the following is a brief description:

FIG. 1 is a longitudinal view including a partial cross-section illustrating a low pressure accumulator assembly for use with a pump according to the present invention.

FIG. 2 is a longitudinal view of a cross-section of a first prior art assembly of a snap ring into an accumulator housing with a piston.

FIG. 3 is a longitudinal view of a cross-section of a second prior art assembly of a snap ring into an accumulator housing with a piston.

DESCRIPTION OF A PREFERRED EMBODIMENT

Figure 4:
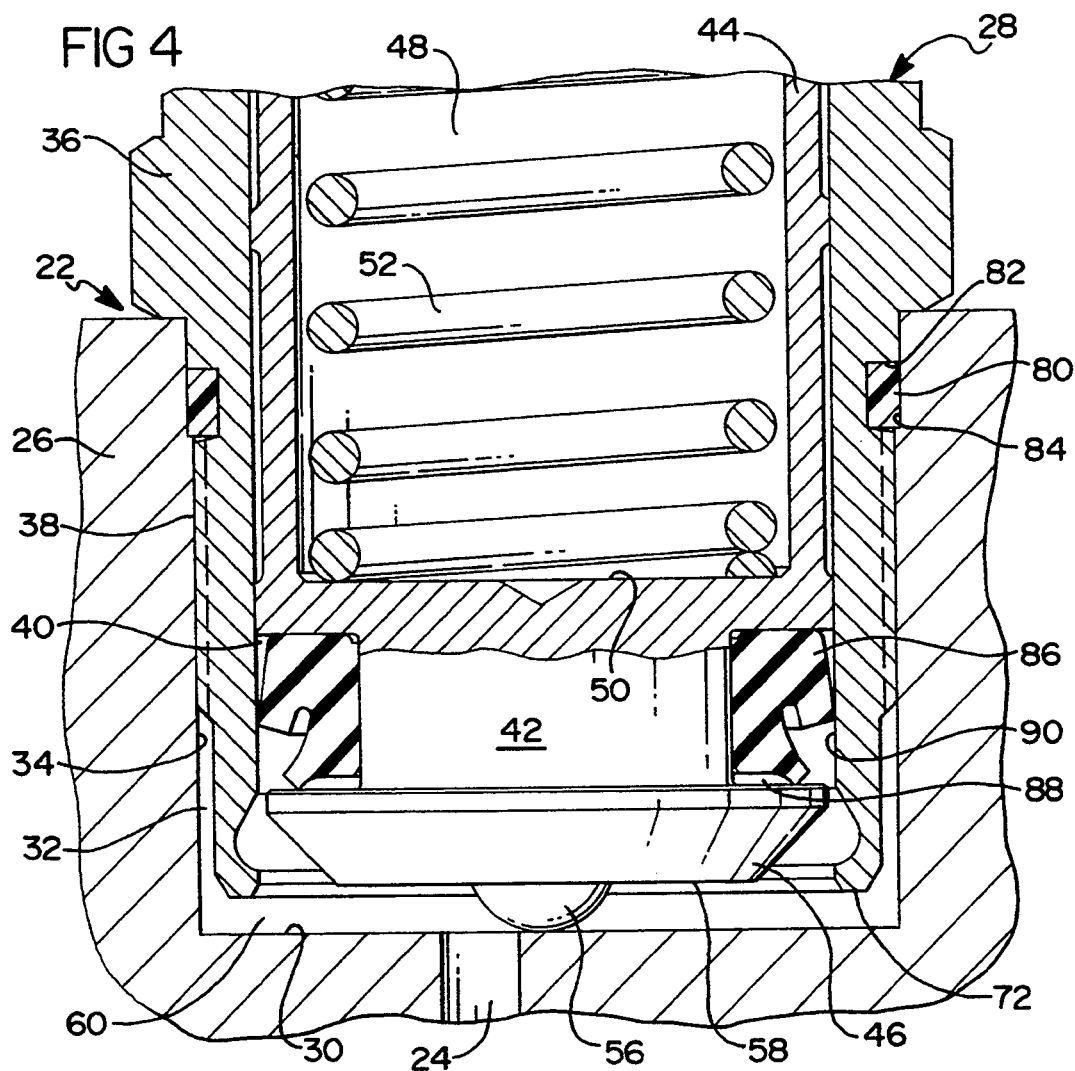
FIG. 4 is a longitudinal cross-sectional view of a portion of a low pressure accumulator assembly according to the present invention illustrating a first embodiment of a protrusion of an accumulator piston.

A pump 20 having a low pressure accumulator assembly 22 is illustrated in FIG. 1. In the disclosed embodiment, pump 20 is used with an antilock braking system. Low pressure accumulator assembly 22 is activated during an antilock braking cycle to receive pressurized fluid flowing through a fluid flow opening 24 of a pump housing 26. While low pressure accumulator assembly 22 comprises the use of two, differently sized fluid accumulators 28 to react with fluid from openings 24, the assembly and operation of each of accumulators 28 is identical.

Fluid flow opening 24 extends through a transverse base 30 of a longitudinally extending chamber 32 within pump housing 26, chamber 32 having sidewalls 34. Accumulator 28 includes an accumulator housing 36 with a laterally spaced outer surface 38 that engages sidewalls 34 of chamber 32. Accumulator housing 36 has a longitudinally extending bore 40 that receives an accumulator piston 42 with an upper piston body 44 and a lower upper piston head 46. Piston body 44 has a longitudinally extending cavity 48 with a transverse spring thrust surface 50. An outwardly biased spring 52 is disposed within bore 38 between a transverse floor 54 of accumulator housing 36 and spring thrust surface 50. Spring 52 acts as a biasing means to bias piston head 46 longitudinally outwardly from accumulator housing 36 to selectively engage transverse base 30 of pump housing 32. At least one protrusion 56 extends away from an outer surface 58 of piston head 46 to limit an area of engagement between outer surface 58 and base 30 of pump housing 26.

A gap 60 between outer surface 58 of piston head 46 and base 30 of pump housing 26 is required for the proper operation of low pressure accumulator assembly 22. During an antilock braking cycle, pressurized brake fluid flows through fluid flow opening 24 into accumulator 28 against the biasing effect of spring 52. If there is no gap 60, then the pressure applied by the fluid is limited to the area of outer surface 58 in contact with opening 24. Insufficient force results to counter the biasing effect of spring 52, resulting in the failure of accumulator assembly 22.

Gap 60 also prevents sticking between outer surface 58 and base 30. Sticking may result if outer surface 58 and base 30 are particularly smooth or flat.

As shown in prior art FIG. 2, before the use of protrusion 56, a snap ring 62 has typically been inserted into an upper groove 64 of accumulator housing 36 to limit the longitudinal travel of piston 42. Further, snap ring 62 locks spring 52 and piston 42 within accumulator housing 36, ostensibly to prevent component separation of accumulator 28 during assembly. Piston 42 includes a chamfered edge 66 that engages snap ring 62. To insert snap ring 62 into groove 64, a hollow insertion tool 68 with a tapered sleeve 70 is positioned over the open end 72 of accumulator housing 36 to act as a guide. Extending a short longitudinal distance into bore 40 of accumulator housing 36, sleeve 70 locates snap ring 62 at the proper depth. An assembly piston 74 pushes the snap ring 62 through tool 68 and into groove 64. However, the high spring rate of snap ring 62 destroys sleeve 70 of insertion tool 68, causing unwanted contamination and unacceptable failure of accumulator assembly 22 during antilock braking cycles.

A hollow insertion tool 76, shown in prior art FIG. 3, does not have a tapered sleeve. Assembly piston 74 pushes the snap ring 62 through the insertion tool and into groove 64. However, by removing tapered sleeve 70, the snap ring prematurely expands before entering groove 64, creating a burr on an upper radially inner surface 78 of accumulator housing 36. Thus, unwanted contamination still results in unacceptable failure of accumulator assembly 22.

Low pressure accumulator assembly 22 is shown in greater detail in FIG. 4. Accumulator housing 36 is press fit within chamber 32 of pump housing 26. Alternatively, sidewalls 34 of chamber 32 and outer surface 38 of accumulator housing 36 may have mating threads to secure the two housings together. A fluid seal 80 is disposed in a groove 82 formed in accumulator housing 36 and engages a ledge 84 of cavity 48. Fluid seal 80 prevents leakage from accumulator assembly 22.

Oil ring lip seal 86, received in a groove 88 of piston 42 between piston body 44 and piston head 46, engages bore 40 to seal piston 42 within accumulator housing 36. Thus, fluid does not leak around piston head 46 to interfere with the operation of accumulator 28. In practice, the engagement of lip seal 86 with side walls 90 of bore 40 is sufficient to retain piston 42 within accumulator housing 36 during assembly. Thus, a snap ring such as snap ring 62, shown in FIGS. 2 and 3, is not required to prevent component separation. Alternatively, once spring 52 and piston 42 are received within accumulator housing 36, open end 72 of the accumulator housing may be rolled radially inwardly to lock spring 52 and piston 42 in place. As a result, the present invention uses fewer components and requires less assembly time. While cost is reduced, however, accumulator assembly 22 also works better than prior art assemblies.

In the illustrated embodiment, a single protrusion 56 is centered on outer surface 58 of piston head 46. Otherwise, when protrusion 56 engages base 30, some longitudinal biasing of spring 52 may be converted to a radial loading between piston 42 and walls 88 of bore 40. Radial loading increases resistance to longitudinal travel by piston 42 and decreased efficiency of accumulator 28 during operation.

Fluid flow opening 24 is offset from protrusion 56 to prevent interference between the protrusion and the fluid opening. If the opening is blocked by the protrusion, the accumulator assembly will not work properly.

A plurality of protrusions may be used. Again, however, the elimination of induced radial loading is important. Typically, such protrusions will be equally spaced from the center of outer surface 58, and share a common longitudinal length.

Figure 5:
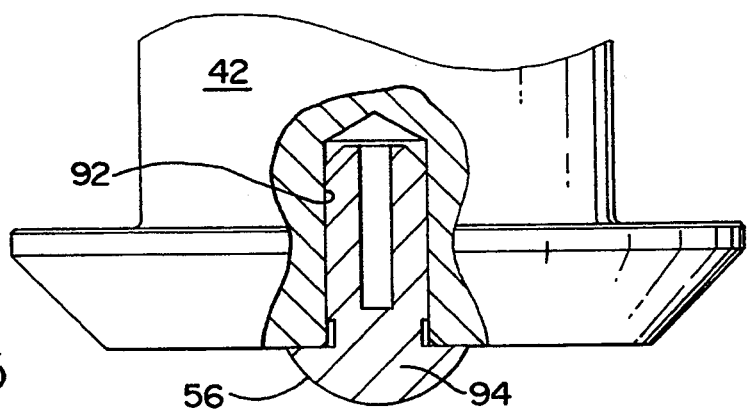
FIG. 5 is a longitudinal view including a partial cross-section of an accumulator piston illustrating a second embodiment of a protrusion.

In the illustrated embodiment, protrusion 52 is a machined nipple that is integrally formed with the rest of piston head 46. An alternative embodiment of protrusion 52 is shown in FIG. 5. A longitudinal bore 92 is adapted to receive a thrust button 94 that includes protrusion 56. This alternative embodiment allows retrofitting of existing accumulator pistons.

Preferred embodiments of the present invention have been described. It is to be understood that variations and modifications may be employed without departing from the scope of the present invention. Accordingly, the following claims should be studied to learn the true scope of the present invention.

We claim:

1. A low pressure fluid accumulator assembly for a pump, comprising:
   a pump housing with a longitudinally extending chamber having a base;
   a fluid flow opening, said fluid flow opening formed at said base of said pump housing chamber;
   a fluid accumulator housing, said accumulator housing received in said pump housing chamber and including a longitudinally extending bore;
   an accumulator piston received in said bore, said piston including an upper piston body and a lower piston head, said piston head being biased outwardly of said bore to selectively engage said base of said pump housing chamber; and
   a protrusion means fixed in and extending longitudinally outwardly from said piston head for limiting an area of engagement between said piston head and said base so that fluid flowing from said opening into said chamber engage a greater area of said piston head, allowing said chamber to receive the fluid at a more rapid rate, wherein said protrusion means has a partial spherical outer surface, adapted to contact said base at a single point of contact.

2. A fluid accumulator assembly as recited in claim 1, wherein a biasing means is disposed between a floor of said accumulator housing and said piston body.

3. A fluid accumulator assembly as recited in claim 2, wherein said biasing means comprises a spring.

4. A fluid accumulator assembly as recited in claim 1, wherein said protrusion comprises a nipple integrally formed with said piston head.

5. A fluid accumulator assembly as recited in claim 1, wherein said protrusion means comprises a thrust button fixed in a longitudinal bore of said piston head.

6. A fluid accumulator assembly as recited in claim 1, wherein said protrusion means is centered on said piston head.

7. A fluid accumulator assembly as recited in claim 1, wherein said fluid flow opening is offset from said protrusion.

8. A fluid accumulator assembly as recited in claim 4, wherein an open end of said accumulator housing has a radially inwardly extending portion to prevent removal of said accumulator piston from said bore during assembly.

* * * * *